Nov. 16, 1954  A. W. MILLER  2,694,584
COUPLING
Filed Feb. 18, 1950  2 Sheets-Sheet 1
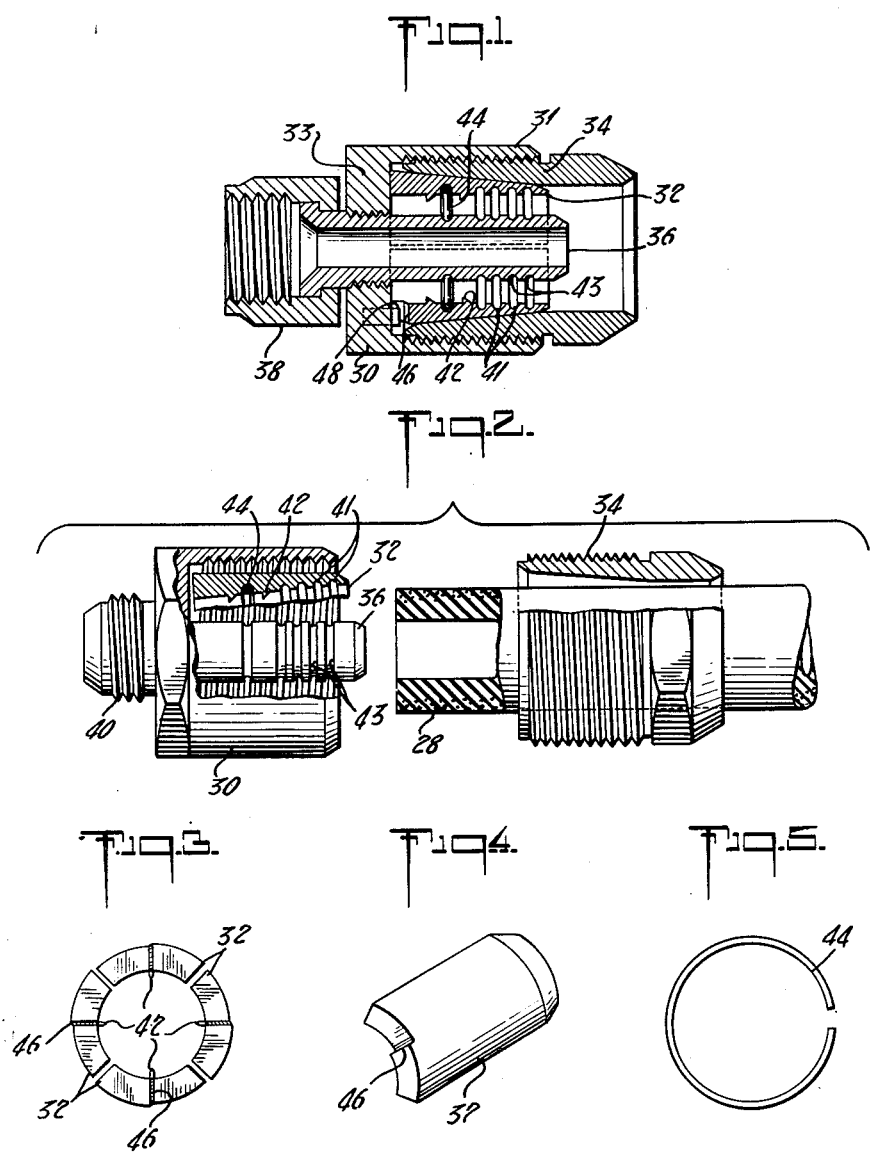
INVENTOR.
ALBERT W. MILLER
BY
ATTORNEYS Nov. 16, 1954  A. W. MILLER  2,694,584
COUPLING
Filed Feb. 18, 1950  2 Sheets-Sheet 2
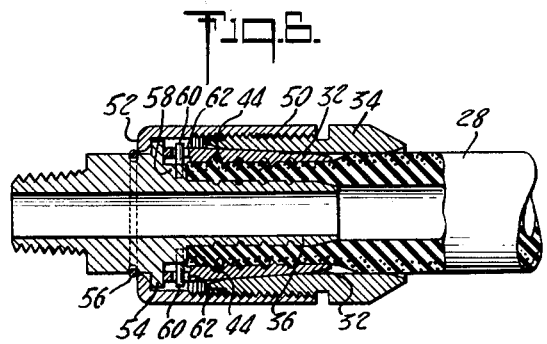
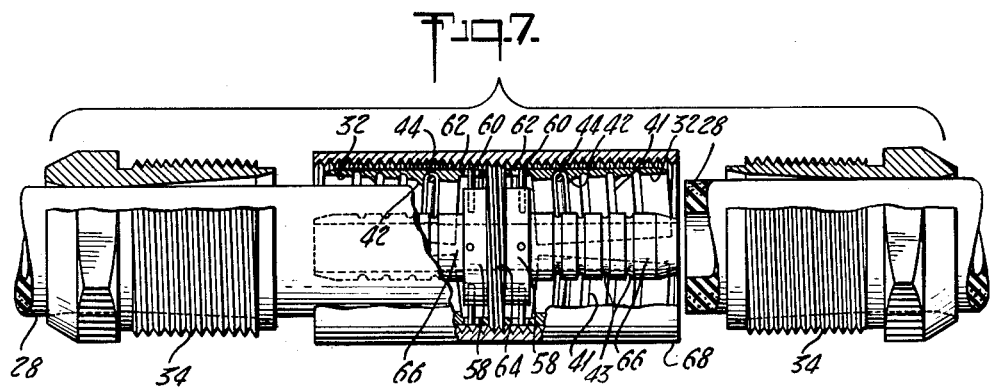
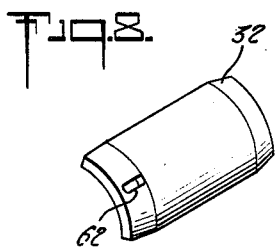
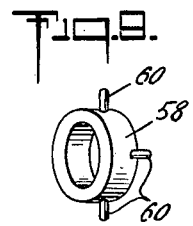
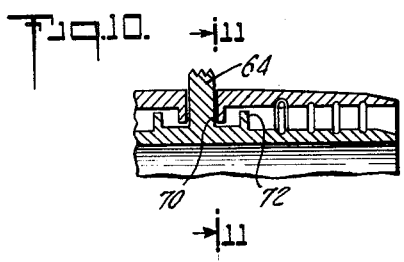
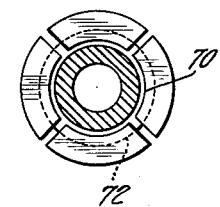
INVENTOR.
ALBERT W. MILLER
BY
ATTORNEYS 2,694,584
Patented Nov. 16, 1954

2,694,584
COUPLING

Albert W. Miller, Jamaica, N. Y.; Helen Emily Miller, executrix of Albert W. Miller, deceased, assignor to Helen Emily Miller Application February 18, 1950, Serial No. 144,967

4 Claims. (Cl. 285—86)

The present invention relates to couplings for elongated members, and has special reference to detachable couplings for reinforced hose.

One of the objects of the invention is to provide a coupling of this character which is of simple and strong construction, which may be easily applied and detached, and in which the parts are so held as to effectively prevent loosening thereof when subjected to vibrations and other strains to which such couplings may be subjected.

Another of the objects of the invention is to provide a novel and improved coupling.

The several features of the invention, whereby these and other objects may be attained, will be readily understood from the following description and accompanying drawings, in which:

Figure 1 is a longitudinal sectional view of a coupling embodying certain features of the invention;

Fig. 2 is an exploded sectional elevation of the same, shown being applied to a reinforced hose, and also showing a screw-threaded terminal connection instead of the swivel nut shown in Fig. 1.

Fig. 3 is an inner end view of a segmental clamping collar constituting a part of the coupling;

Fig. 4 is a view in perspective of one of the segments of the segmental clamping collar;

Fig. 5 is a side view of a wire spring which may be used in association with the segmental clamping collar;

Fig. 6 is a longitudinal sectional view, partly in elevation, of a modified form of coupling with the end of a reinforced hose clamped in the coupling;

Fig. 7 is a longitudinal sectional elevation of a double ended coupling for fastening together in close proximity the ends of two hose;

Fig. 8 is a view in perspective of a modified form of one of the segments of the segmental clamping collar;

Fig. 9 is a view in perspective of a retaining ring spider that may be used to retain the segmental collar within the boss when the clamping nut is removed.

Fig. 10 is a sectional view corresponding to a portion of Fig. 7 of another modified form; and Fig. 11 is a sectional elevation taken on the line 11 of Fig. 10.

The present application is a continuation in part of my Patent No. 2,544,712 issued March 13, 1951.

The coupling illustrated in Figs. 1 and 2 is especially adapted for holding a wire reinforced rubber hose 28 such as high pressure hose. The coupling is provided with a body member 30, a segmental collar 32, and a clamping sleeve 34. The body member 30 is provided with a screw-threaded boss 31 which has an inwardly turned flange or bottom wall 33. The coupling is further provided with an extended nipple 36, which as shown in Fig. 1, has its inner end screw-threaded through an aperture in the bottom wall 33 of the body member, and its outer end provided with a swivel connection 38. In the form illustrated in Fig. 2, the outer end of the nipple is shown provided with a screw-threaded terminal fitting 40. In this form the nipple and boss may be formed integral with the body member 30.

As shown, the inner surfaces of the segments of the segmental collar are provided with serrations 41 and with teeth or pins 42, and the nipple is also provided with serrations 43 for engaging the outer and inner surfaces of the hose 28 when the hose is placed on the nipple and the coupling is tightened into clamping position. Also, as shown, a spring 44 in the form of a split circular spring wire is positioned in grooves in the segments of the segmental collar so as to tend to resiliently maintain the segments spread apart. In Figs. 1, 3 and 4 there is shown a notch in the end of each segment forming a shoulder 46 which is adapted to engage a stop pin 48 on the bottom wall 33. This pin and shoulder connection limits the turning movement of the segments of the segmental collar when the clamping sleeve 34 is rotated.

In applying the coupling, the clamping sleeve 34 is placed over the end of the hose 28 and the nipple 36 is forced into the aperture of the hose with the end of the hose abutting the bottom wall 33. This positions the end of the hose within the segmental collar 32 and the screw-threaded boss 31. The clamping sleeve 34 may then be screw-threaded into the boss, thus causing the segmental collar 32 to be contracted to tightly clamp the end of the hose on the nipple with the teeth 42 embedded in the material of the hose in such a manner as to securely attach the collar to the hose.

In detaching the coupling by unscrewing the body member 30 and the clamping sleeve 34, the spring 44 acts to release the segmental collar 32 from the hose, thus permitting the hose to be removed from the coupling.

The inner end of the clamping sleeve 34 is tapered and the outer end of the segmental collar 32 is likewise tapered but in the opposite direction, and this end of the collar may project a distance beyond the end of the boss. These two tapered faces enable the end of the clamping sleeve 34 to easily slide between the outer surface of the segmental collar 32, as it is resiliently held open or expanded by the spring 44, and the inner surface of the boss 31 so as to permit the easy engagement of their threaded surfaces.

The threading together of the boss and the clamping sleeve 34 causes the latter to advance on the cooperating threads and its cone-shaped inner surface to thus force a wedge in behind the segmental collar 32 in such a way as to squeeze the segments together, so as to cause the teeth 42 on their inner faces to penetrate the surface of the hose and the high points of the serrations of both the segments and the nipple to become embedded from opposite sides in the wall of the hose. Because of the long, thin wedging action provided in this construction, a powerful pressure force may be applied to the wall of the hose lying between the nipple 36 and the inner face of the segmental collar 32.

It will be apparent that the parts of the coupling are securely held, and that the segmental collar 32 throughout its length becomes firmly attached to the hose as it clamps the hose to the nipple 36. The teeth 42 spaced one in front of the other on the inner face of each segment penetrate the material of the hose and enter between the strands of the reinforcing wire, and effectively cooperate with the embedded serrations 41 and 43 to firmly and securely fasten the hose in the coupling.

The inner surface of the outer end of the clamping sleeve 34 is formed with a taper to provide a smooth bearing surface and permit the hose to be gradually bent when flexed at the coupling. This prevents damage to the hose wall which occurs when the hose is bent or flexed over the end of a shaft sleeve.

In the form shown in Fig. 6, there is provided a screw-threaded boss 50 which is also in the form of a separate sleeve having its rear end provided with an inwardly turned flange 52 as in Fig. 1, but in this form the flange engages the rear side of an annular flange 54 on the body member. The boss 50 may be held on the body member with its flange 52 against the flange 54 by means of a snap ring 56 fitted in a groove in the body member.

The body member adjacent the rear end of the hose nipple 36 is provided with a shoulder 58 that may either be made integral with the body member as shown in Fig. 6, or as a separate part as shown in Fig. 9 and held in place by being forced over the nipple and secured to the rear end thereof. This shoulder 58 serves as an abutment for the inner end of the hose and it is provided with radially projecting pins or posts 60, each of which is adapted to extend through an oblong aperture or slot 62 near the rear end of each of the segments of the segmental collar.

In assembling the parts of this form of coupling, the slots of the segments of the segmental collar are first placed over the posts 60, then the threaded boss 50 is brought up over the collar with its flange 52 passing over the snap ring 56 and abutting the annular flange 58. When these parts are thus assembled at the factory, they need not be disassembled in the use of the coupling.

In applying the coupling the clamping sleeve 34 is first placed over the end of the hose and the hose is then forced over the nipple 36, and the boss 50 and the clamping sleeve 34 threaded together as in the case of the form shown in Fig. 1.

The post and slot connection between the segments of the segmental collar and the ring 58 serves to hold the segments from coming out when the boss 50 and clamping sleeve 34 are unscrewed from each other and the hose detached, and it also holds the resiliently expanded segments of the segmental collar in an equally spaced relationship so that as the coupling is tightened to clamp the hose, pressure will be applied to the hose from four equally spaced radial lines. Other means may be used to hold and control the movement of the segmental collar. The holes 62 are of oblong form so as to prevent the posts 60 from interfering with the outward axial self-tightening movement of the segmental collar which occurs at the inception of any tendency for the hose to pull out of the coupling at any time after the collar has been clamped on the hose. The segments of the segmental collar, as in the case of the form shown in Fig. 1, may be resiliently held spread apart by means of the expansion spring 44.

The form of coupling shown in Fig. 7, is double-ended and designed for fastening together in close proximity the ends of the two hose. The body of this coupling comprises a partition member 64, oppositely directed nipples 66, and shoulders or rings 58 at opposite sides of the partition member 64. These parts may all be made integral, or separate and secured together. The partition member 64 is shown screw-threaded into a mantle sleeve 68. The sleeve 68 is preferably screw-threaded throughout its length and the partition 64 is threaded into the sleeve from either end thereof into a central position as shown so as to provide oppositely directed screw-threaded bosses. A segmental collar is provided at each side of the partition 64, this collar corresponding to the segmental collar shown in Figs. 1 and 6. The segments of each collar are provided with oblong slots such as the slots 62, which are received over the radial posts 60. Also, the segments of each of the segmental collars may be resiliently held extended by means of the spring 44, and the segments are provided with teeth 42 and serrations 41 as in the case of the form shown in Figs. 1 and 6.

In assembling the parts, the slots of the segments of the segmental collars are first placed over the posts 60 and the assembly is then screwed to a central position in the mantle sleeve 68. When thus assembled, both hose 28 may be forced over the oppositely extending nipples and against the shoulders formed by the rings 58. This positions the ends of the hose within the segmental collars and the screw-threaded bosses formed by the mantle sleeve 68. The clamping sleeves 34 may then be screw-threaded into the ends of the mantle sleeve 68 to securely fasten the hose at opposite sides of the partition 64 to the coupling.

It will be understood that instead of screw-threading the partition member 64 into the mantle sleeve 68, it may be centrally positioned in an unthreaded bore of the mantle sleeve, and then the mantle sleeve screw-threaded in from each end to form the threaded bosses.

In the form shown in Figs. 10 and 11, instead of the pin and slot connection above described between the segments of the segmental collars and the body members for limiting longitudinal movement of the segments, the inner ends of the segments of each collar are provided with inwardly directed flanges 70 that are received between the partition member 64 and an annular flange 72 at each side of said partition member.

The forms of coupling above described are particularly adapted to be applied to reinforce rubber hose, but it will be apparent that with slight modification they may also be used for connecting tubes or rods made of metal or plastic material.

The outer rubber covering of the hose need not be removed before attaching the coupling as it cannot peel or skive off under heavy strain because teeth 42 are forced through it and become snagged into the hose armouring, and the wire mesh of the armouring cannot become unbraided or strip out as the outer rubber covering of the hose is bonded to it.

The segmental collar may, if desired, be provided with complementary overlapping longitudinal lip portions so that the segments form a complete enclosure as they are squeezed together.

Each segmental collar is selectively preformed with a predetermined radius for a particular circle, so that when it is contracted to its final clamping position, it forms a perfect circle and grips the hose with a uniform circumferential pressure.

The coupling may be attached to and removed from the hose as desired without breaking, bending, deforming or otherwise damaging any of its parts. Nor will the hose be torn, masticated or defaced by such attachment and removal.

An important feature of my improved coupling is that a longitudinal force tending to pull the hose out of the coupling will be translated into a radial component as the segments tend to be urged toward the small end of the embracing portion of the clamping sleeve. This increases the clamping force of the gripping elements of the coupling and provides an automatic retightening means to compensate for any tendency of the joint to fail. Such self-adjustment compensates for the tendency to disruption of the connection resulting from sudden increases in strain due to surges of internal pressure and axial loading. Also it tends to continuously retighten the connection to compensate for the tendency to looseness in the gripping hold of the coupling because of shrinkage due to cold flow or otherwise in the thickness of the wall of the clamped member or to the expansion of the coupling parts. Thus the coaction of the elements of this coupling construction employs the forces tending to disrupt the connection to automatically enforce a contraction of the contractible collar and thereby maintain or increase the gripping hold of the coupling on the clamped member, doing so at any time after the joint is established and at the inception of any tendency to looseness in the connection.

As will be evident to those skilled in the art, my invention permits various modifications without departing from the spirit thereof or the scope of the appended claims.

What I claim is:

1. In a detachable coupling for a hose or other tubular member, a body member, a nipple joined to and projecting axially from the body member, an annular wall anchored on the exterior of the nipple adjacent the body portion, an internal screw threaded boss extending axially from the wall in the same direction as the nipple, a clamping collar comprising separate substantially rigid segments with outer surfaces tapered inwardly in a longitudinal direction away from the body member, connecting means between the collar and the body member for loosely holding the collar within the threaded sleeve comprising a clamping sleeve complementary threaded to the boss embracing the collar, the clamping collar overlying a part of the nipple, means biasing the segments radially outwardly relative to said nipple against the clamping sleeve in a direction away from the nipple, the end of the collar abutting the wall, said clamping sleeve having a portion of its inner surface flared outwardly and engaging the outer tapered surfaces of the segments so that upon screw threading together the clamping sleeve and the said threaded sleeve the segments of the collar are moved inwardly.

2. In a detachable coupling for a hose or other tubular member, a body member, a nipple joined to and projecting axially from the body member, an annular wall anchored on the exterior of the nipple adjacent the body portion, an internal screw threaded boss extending axially from the wall in the same direction as the nipple, a clamping collar comprising separate substantially rigid segments with outer surfaces tapered inwardly in a longitudinal direction away from the body member, serrations on the interior of said segments to preclude longitudinal movement thereof relative to the member to be gripped, connecting means between the collar and the body member for loosely holding the collar within the threaded sleeve comprising a clamping sleeve complementary threaded to the boss embracing the collar, the clamping collar overlying a part of the nipple, means biasing the segments radially outwardly relative to said nipple against the clamping sleeve in a direction away from the nipple, the end of the collar abutting the wall, said clamping sleeve having a portion of its inner surface flared outwardly and engaging the outer tapered surfaces of the segments so that upon screw threading together the clamping sleeve and the said threaded sleeve the segments of the collar are moved inwardly.

3. In a detachable coupling for a hose or other tubular member, a body member, a nipple joined to and projecting axially from the body member, an annular wall anchored on the exterior of the nipple adjacent the body portion, an internal screw threaded boss extending axially from the wall in the same direction as the nipple, a clamping collar comprising separate substantially rigid segments with outer surfaces tapered inwardly in a longitudinal direction away from the body member, serrations on the interior of said segments to preclude longitudinal movement thereof relative to the member to be gripped, connecting means between the collar and the body member for loosely holding the collar within the threaded sleeve comprising a clamping sleeve complementary threaded to the boss embracing the collar, the clamping collar overlying a part of the nipple, means biasing the segments radially outwardly relative to said nipple against the clamping sleeve in a direction away from the nipple, the end of the collar abutting the wall, said clamping sleeve having a portion of its inner surface flared outwardly and engaging the outer tapered surfaces of the segments so that upon screw threading together the clamping sleeve and the said threaded sleeve the segments of the collar are moved inwardly, and means comprising projections on the ends of said segments engageable with stop means on said wall to preclude rotating movement of said segments.

4. In a detachable coupling for a hose or other tubular member, a body member, a nipple joined to and projecting axially from the body member, an annular wall anchored on the exterior of the nipple adjacent the body portion, an internal screw threaded boss extending axially from the wall in the same direction as the nipple, a clamping collar comprising separate substantially rigid segments with outer surfaces tapered inwardly in a longitudinal direction away from the body member, serrations on the interior of said segments to preclude longitudinal movement thereof relative to the member to be gripped, connecting means between the collar and the body member for loosely holding the collar within the threaded sleeve comprising a clamping sleeve complementary threaded to the boss embracing the collar, the clamping collar overlying a part of the nipple, means biasing the segments radially outwardly relative to said nipple against the clamping sleeve in a direction away from the nipple, the end of the collar abutting the wall, said clamping sleeve having a portion of its inner surface flared outwardly and engaging the outer tapered surfaces of the segments so that upon screw threading together the clamping sleeve and the said threaded sleeve the segments of the collar are moved inwardly, and means comprising projections on the ends of said segments engageable with said wall to preclude rotating movement of said segments, said connecting means between said collar and said body member comprising a pin and slot connection between the segments of said collar and said body member for holding the collar within said threaded sleeve for permitting limited longitudinal movement therewith with relation to said sleeve.

References Cited in the file of this patent

UNITED STATES PATENTS

| Number | Name | Date |
|---|---|---|
| Re. 22,810 | Miller | Nov. 5, 1946 |
| 725,837 | Gmeiner | Apr. 21, 1903 |
| 1,181,676 | Lambkin | May 2, 1916 |
| 1,320,113 | Bemis | Oct. 28, 1919 |
| 1,392,109 | Bisset | Sept. 27, 1921 |
| 1,844,023 | Terry | Feb. 9, 1932 |
| 1,863,870 | Moore | June 21, 1932 |
| 1,946,629 | Laughlin | Feb. 13, 1934 |
| 2,120,275 | Cowles | June 14, 1938 |
| 2,280,892 | Cowles | Apr. 28, 1942 |
| 2,371,971 | Main | Mar. 20, 1945 |

FOREIGN PATENTS

| Number | Country | Date |
|---|---|---|
| 118,275 | Switzerland | Mar. 16, 1926 |
| 699,641 | Germany | Dec. 2, 1940 |